No. 871,653. PATENTED NOV. 19, 1907.
S. E. WARREN.
FRUIT PRESS.
APPLICATION FILED NOV. 21, 1906.

2 SHEETS—SHEET 1.

Witnesses

Inventor
Samuel E. Warren
By
Victor J. Evans, Attorney

No. 871,653. PATENTED NOV. 19, 1907.
S. E. WARREN.
FRUIT PRESS.
APPLICATION FILED NOV. 21, 1906.

2 SHEETS—SHEET 2.

Witnesses
R. C. Claflin

Inventor
Samuel E. Warren
By Victor J. Evans
Attorney

UNITED STATES PATENT OFFICE.

SAMUEL E. WARREN, OF EUREKA, CALIFORNIA.

FRUIT-PRESS.

No. 871,653.	Specification of Letters Patent.	Patented Nov. 19, 1907.

Application filed November 21, 1906. Serial No. 344,478.

*To all whom it may concern:*

Be it known that I, SAMUEL E. WARREN, a citizen of the United States of America, residing at Eureka, in the county of Humboldt and State of California, have invented new and useful Improvements in Fruit-Presses, of which the following is a specification.

My invention has relation to fruit pressers and it consists in the construction and arrangement of parts, as will be hereinafter described and particularly pointed out in the claim.

Figure 1:
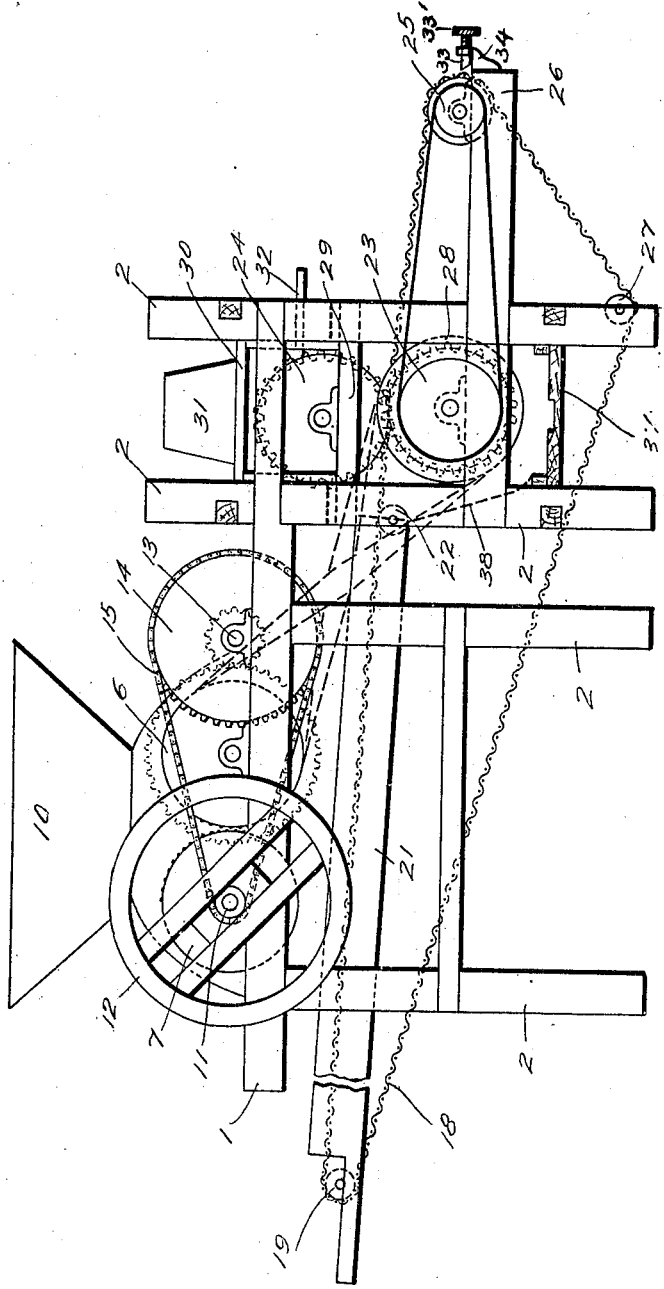
Figure 2:
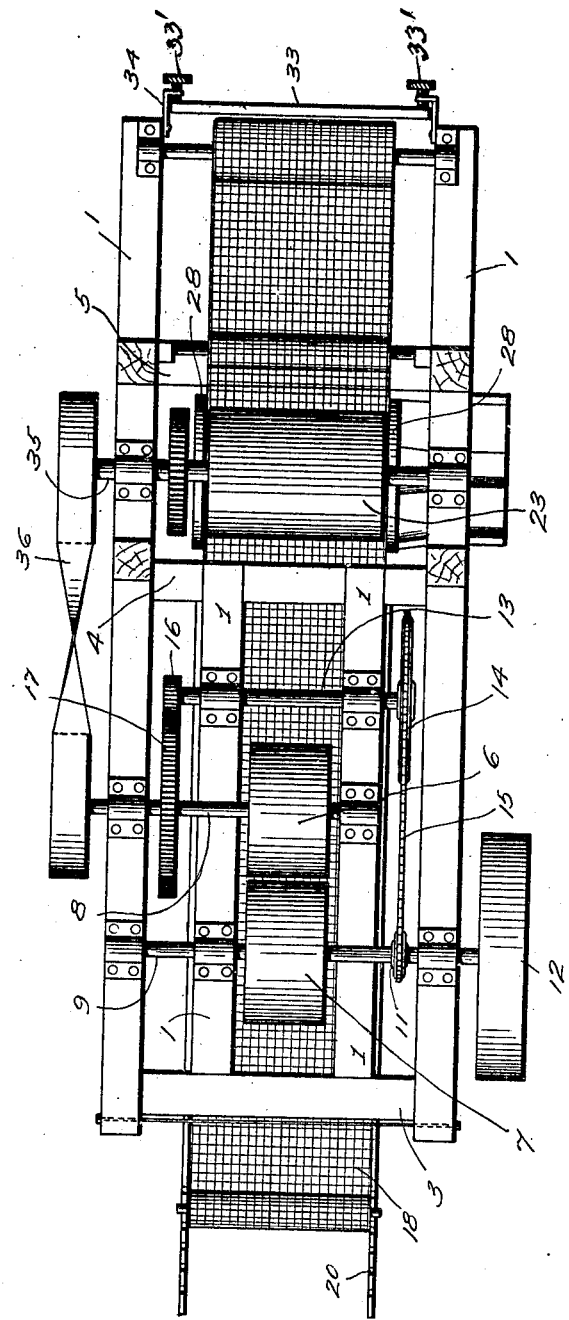

In the accompanying drawings Figure 1 is a side elevation of the machine made in accordance with my invention. Fig. 2 is a plan view of the same, with the hopper and the weight for one of the roller frames removed.

Referring to the drawings for a more particular description of my invention, the numeral 1 designates the longitudinal supporting bars of the frame of the machine supported upon legs 2 and provided with an end bar 3 and suitable cross bars 4 and 5. Supported upon the frame are the two grinding rollers 6 and 7, said rollers being mounted upon shafts 8 and 9 journaled in keepers on the top of the frame. A suitable hopper 10 is placed over the rollers 6, 7 to receive the apples or other fruit and to guide the same between the rollers 6, 7. On the shaft 9 of the roller 7 a sprocket wheel 11 is fixed, and upon the outer end of said shaft a pulley 12 is secured which may be connected by a belt to a suitable motor. However, if the machine is of such size that it may be run by hand, a crank will be attached to said wheel or pulley 12. A shaft 13 is mounted on the frame and carries at one end a sprocket wheel 14 of much larger diameter than the sprocket wheel 11. A sprocket chain 15 passes around the sprocket wheels 11 and 14. A pinion 16 on the shaft 13 engages a large gear wheel 17 on the shaft 8. The result of this construction is that the grinding roller 7 travels or rotates more rapidly than the roller 6, and by this means the rollers are always kept clean and roller 6 serves as a feeding roller, while roller 7 acts as a grinder. A conveyer belt 18 passes around a roller 19 adjustably secured in notches 20 in the projecting ends of an inclined trough 21, said belt 18 passing over said trough, over a roller 22, and between the expressing rollers 23 and 24, extending thence around a roller 25 journaled in extension bars 26 at one end of the frame. The belt extends from the roller 25 around the roller 27 and from thence to the roller 19. This belt is preferably formed of woven wire of the proper gage and mesh, said meshes being of the desired size for the purpose designed, and the belt being preferably formed of galvanized iron. The expressing roller 23 is provided with side flanges 28, the purpose of which is to prevent the juices from running out at the sides of said roller and also to guide the belt 18 in its movement.

The upper expressing roller 24 is journaled upon a sliding frame 29 mounted between the uprights 2 and provided with a top 30 upon which a weight 31 is placed to hold the roller 24 down upon the top of the belt 18 with sufficient force to express the juices from the pulp. A suitable scraper 32 is mounted in position to have contact with the surface of the roller 24 for cleaning the pulp therefrom as the roller is rotated, and a similar scraper 33 is adjustably mounted upon angular brackets 34 for cleaning the belt 18 as it passes around the roller 25. To permit of the scraper 33 being adjustable, as shown in Fig. 2, I provide set screws 33' which pass through the outer angular portions of the brackets 34, and have their inner ends secured to opposite ends of the outer surface of the scraper whereby by turning the set screws in either direction the said scraper is capable of being moved to or from the belt 18. The rollers 23 and 24 are provided with intermeshing gear wheels at one end thereof. Upon the shaft 35 of the roller 23 a pulley is attached at one end, and a crossed belt 36 connects said pulley with a pulley on the end of shaft 8. A suitable spout 37 is disposed between the two uprights under the roller 23 to receive the juice of the fruit and convey it to a suitable receptacle or vat. A guide plate 38 extends from the rear end of the trough 21 to the spout 37, as shown in dotted lines in Fig. 1.

The operation of my invention may be briefly described as follows: The fruit is placed in the hopper 10 and is passed between the grinding rollers 6 and 7 where it drops as a pulp upon the endless belt 18, the pulp being then carried upon the belt between the expressing rollers 23, 24, the juice being carried through the interstices in the belt 18, and running off the roller 23 into the spout 37. The juice which may be expressed from the fruit passing through the grinding rollers 6, 7, is caught by the trough 21 down which it passes into the spout 37.

The size of the weight 31 may be increased or diminished depending upon the character of the work to be done.

From the foregoing it will be obvious that my invention provides for a continuous operation of grinding and expressing the juices from fruit, and that the machine may be set up in an orchard and operated without carrying the apples or other fruit any great distance as has been the practice, and that a great quantity of cider can be produced in a comparatively short time.

Having thus described the invention, what I claim is:

A fruit presser comprising a frame provided with an inclined trough having rearwardly cut-away ends with rows of notches therein, and a weighted sliding adjusting frame, bars projecting outward from the frame, presser rollers arranged one above the other and journaled respectively in the sliding adjusting frame and said bars, a roller on the ends of the bars, an adjustable roller in said notches, and intermediate rollers journaled on the frame, a belt passing through said trough over the adjustable roller and over the roller of said bars and also over the intermediate rollers and between the presser rollers, angular brackets secured to the ends of the bars provided with adjusting screws, a scraper secured to the inner ends of the adjusting screws and serving to contact with the belt, substantially as specified.

In testimony whereof, I affix my signature in presence of two witnesses.

SAMUEL E. WARREN.

Witnesses:
 C. P. MOORE,
 F. H. SELVAGE.